US011238282B2

(12) United States Patent
Ng et al.

(10) Patent No.: US 11,238,282 B2
(45) Date of Patent: Feb. 1, 2022

(54) SYSTEMS AND METHODS FOR AUTOMATED DETECTION OF CHANGES IN EXTENT OF STRUCTURES USING IMAGERY

(71) Applicant: Pictometry International Corp., Rochester, NY (US)

(72) Inventors: Stephen Ng, Rochester, NY (US); David R. Nilosek, Rochester, NY (US); Phillip Salvaggio, Rochester, NY (US); Shadrian Strong, Bellevue, WA (US)

(73) Assignee: Pictometry International Corp., Rochester, NY (US)

( * ) Notice: Subject to any disclaimer, the term of this patent is extended or adjusted under 35 U.S.C. 154(b) by 50 days.

(21) Appl. No.: 16/891,982

(22) Filed: Jun. 3, 2020

(65) Prior Publication Data

US 2020/0387704 A1    Dec. 10, 2020

Related U.S. Application Data

(60) Provisional application No. 62/858,656, filed on Jun. 7, 2019.

(51) Int. Cl.
*G06K 9/00* (2006.01)
*G06T 7/13* (2017.01)
(Continued)

(52) U.S. Cl.
CPC ....... *G06K 9/00637* (2013.01); *G06K 9/6215* (2013.01); *G06K 9/6217* (2013.01);
(Continued)

(58) Field of Classification Search
CPC ............. G06K 9/00637; G06K 9/6215; G06K 9/6217; G06K 9/6267; G06K 9/00214;
(Continued)

(56) References Cited

U.S. PATENT DOCUMENTS 7,424,133 B2   9/2008  Schultz et al.
7,650,047 B2   1/2010  Jin et al.
(Continued)

FOREIGN PATENT DOCUMENTS

GB      2554361 A      4/2018
JP   WO 2006/120724   11/2016
WO   WO2018/071983 A1 4/2018

OTHER PUBLICATIONS

Qin et al., "3D Change Detection—Approaches and Applications", ISPRS Journal of Photogrammetry and Remote Sensing, pp. 41-56, 2016.
(Continued)

*Primary Examiner* — Samir A Ahmed
(74) *Attorney, Agent, or Firm* — Dunlap Codding, P.C.

(57) ABSTRACT

Systems and methods for automated detection of changes in extent of structures using imagery are disclosed, including a non-transitory computer readable medium storing computer executable code that when executed by a processor cause the processor to: align, with an image classifier model, a structure shape of a structure at a first instance of time to pixels within an aerial image depicting the structure captured at a second instance of time; assess a degree of alignment between the structure shape and the pixels, so as to classify similarities between the structure depicted within the pixels and the structure shape using a machine learning model to generate an alignment confidence score; and determine an existence of a change in the structure based upon the alignment confidence score indicating a level of confidence below a predetermined threshold level of confidence that the structure shape and the pixels within the aerial image are aligned.

20 Claims, 7 Drawing Sheets

(51) Int. Cl.
*G06T 7/70* (2017.01)
*G06K 9/62* (2006.01)
*G06N 3/04* (2006.01)
*G06N 3/08* (2006.01)

(52) U.S. Cl.
CPC ......... *G06K 9/6267* (2013.01); *G06N 3/0454* (2013.01); *G06N 3/088* (2013.01); *G06T 7/13* (2017.01); *G06T 7/70* (2017.01); *G06T 2207/10032* (2013.01); *G06T 2207/20084* (2013.01)

(58) Field of Classification Search
CPC ............... G06K 9/4604; G06K 9/6209; G06K 9/00651; G06T 7/13; G06T 7/70; G06T 2207/10032; G06T 2207/20084; G06T 2207/20076; G06T 2207/30184; G06T 2207/10016; G06T 7/344; G06N 3/0454; G06N 3/088; G06N 3/08
See application file for complete search history.

(56) References Cited

U.S. PATENT DOCUMENTS

| | | | |
|---|---|---|---|
| 8,259,993 | B2 | 9/2012 | Sasakawa et al. |
| 8,285,050 | B2 | 10/2012 | Ozawa |
| 8,385,672 | B2 | 2/2013 | Giuffrida et al. |
| 8,462,992 | B2* | 6/2013 | Chen ................... G06K 9/00637 382/113 |
| 9,389,084 | B1 | 7/2016 | Chen et al. |
| 9,805,261 | B1 | 10/2017 | Loveland et al. |
| 10,977,490 | B1* | 4/2021 | Bokshi-Drotar ...... G06T 7/0002 |
| 2002/0051572 | A1 | 5/2002 | Matsumoto et al. |
| 2009/0067725 | A1 | 3/2009 | Tadashi et al. |
| 2010/0246971 | A1 | 9/2010 | Ohtsubo et al. |
| 2013/0155109 | A1* | 6/2013 | Schultz ...................... G06T 7/50 345/634 |
| 2015/0227808 | A1* | 8/2015 | Zharkov ............... G06K 9/4638 345/441 |
| 2016/0005097 | A1 | 1/2016 | Hsiao et al. |
| 2016/0027051 | A1 | 1/2016 | Gross |
| 2016/0239956 | A1* | 8/2016 | Kang ..................... A61B 6/032 |
| 2016/0259994 | A1 | 9/2016 | Ravindran et al. |
| 2017/0091627 | A1 | 3/2017 | Terrazas et al. |
| 2017/0236024 | A1 | 8/2017 | Wang et al. |
| 2017/0308549 | A1 | 10/2017 | Sims et al. |
| 2018/0089531 | A1* | 3/2018 | Geva ..................... A61B 5/7264 |
| 2018/0089833 | A1* | 3/2018 | Lewis ..................... G06T 7/564 |
| 2019/0065907 | A1 | 2/2019 | Strong et al. |
| 2019/0155973 | A1* | 5/2019 | Morczinek ........... G06K 9/6296 |
| 2019/0271550 | A1* | 9/2019 | Breed .............. G08G 1/096725 |
| 2020/0019825 | A1* | 1/2020 | Frei ....................... G08G 5/0086 |
| 2020/0348132 | A1* | 11/2020 | Du ....................... G06K 9/00664 |
| 2021/0158609 | A1* | 5/2021 | Raskob .............. G06K 9/00657 |

OTHER PUBLICATIONS

Bouziani et al., "Automatic Change Detection of Buildings in Urban Environment from Very High Spatial Resolution Images Using Existing Geodatabase and Prior Knowledge", ISPRS Journal of Photogrammetry and Remote Sensing, pp. 143-153, 2010.

Taneja et al., "Image Based Detection of Geometric Changes in Urban Environments", 2011 International Conference on Computer Vision, 2011.

Ruf et al., "Towards Real-Time Change Detection in Videos Based on Existing 3D Models", Image and Signal Processing for Remote Sensing XXII, vol. 10004, 2016.

Leichtle et al., "Unsupervised Change Detection in VHR Remote Sensing Imagery—An Object Based Clustering Approach in a Dynamic Urban Environment", International Journal of Applied Earth Observation and Geoinformation 54, pp. 15-27, 2017.

European Patent Office acting as the International Searching Authority, International Search Report and Written Opinion regarding PCT App. No. PCT/US20/035945 dated Sep. 18, 2020.

ESRI, Getting Started with ArcGIS, 2005, available at: <http://downloads.esri.com/support/documentation/ao_/1003Getting_Started_with_ArcGIS.pdf >, downloaded on Sep. 1, 2019 (Year: 2005).

Holt, Alec, "Spatial similarity and GIS: the grouping of spatial kinds," 1999, available at: < https://pdfs.semanticscholar.org/1ff7/49c905db58bb884a9d6609de9452edf7921b.pdf >, downloaded on Sep. 1, 2019 (Year: 1999).

Artificial Neural Networks Technology, [online], archived on Nov. 23, 2015, available at:<https://web.archive.org/web/20151123211404/http://www2.psych.utoronto.ca/users/relngold/course> (Year: 2015).

Marr, Bernard, "A Short History of Machine Learning—Every Manager Should Read," [online], Feb. 19, 2016, available at: < https://www.forbes.com/sltes/bernardmarr/2016/02/19/a-short-history-of-machine-learning-every-manager-should-read/#70f07e5415e7 > (Year: 2016).

Krizhevsky et al., "ImageNet Classification with Deep Convolutional Neural Networks," Advances in Neural Information Processing Systems 25, pp. 1097-1105, 2012.

Long et al., "Fully Convolutional Networks for Semantic Segmentation," IEEE Conference on Computer Vision and Pattern Recognition, Jun. 2015.

Goodfellow, et al., "Generative Adversarial Networks," Departement d'informatique et de recherche operationnelle Universite de Montreal, Jun. 2014.

Simonyan et al., "Very Deep Convolutional Networks for Large-Scale Image Recognition" International Conference on Machine Learning, 2015.

Galarreta et al., "UAV-based Urban Structural Damage Assessment Using Object-based Image Analysis and Semantic Reasoning," Nat. Hazards Earth Syst. Sci., 15, 1087-1101; Copernicus Publications; 2015.

Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, The Netherlands, Apr. 2014.

Kang et al., "Building Instance Classification Using Street View Images," ISPRS Journal of Photogrammetry and Remote Sensing, 145, 44-59, Elsevier, Mar. 2018.

\* cited by examiner

SYSTEMS AND METHODS FOR AUTOMATED DETECTION OF CHANGES IN EXTENT OF STRUCTURES USING IMAGERY

CROSS-REFERENCE TO RELATED APPLICATIONS

The present patent application claims priority to the provisional patent application identified by U.S. Ser. No. 62/858,656, titled "SYSTEMS FOR DETECTION OF CHANGES IN EXTENT OF STRUCTURES," filed on Jun. 7, 2019, the entire contents of which are hereby expressly incorporated by reference herein.

BACKGROUND

The detection of changes in the extent of structures, such as buildings, infrastructure, utility towers, roads, bridges, pipelines, and other objects, often requires a person to examine at least a first image and a second image and make a determination as to whether the object is different between the first image and the second image. This can be a time consuming and expensive process. However, current automated processes for the detection of changes of structures from digital images in the field of computerized detections of changes in structures also have drawbacks.

Digital images can be described as pixelated arrays of electronic signals. The array may include three dimensions. Such an array may include spatial (x, y or latitude, longitude) and spectral (e.g., red, green, blue) elements. Each pixel in the image captures wavelengths of light incident on the pixel, limited by the spectral bandpass of the system. The wavelengths of light are converted into digital signals readable by a computer as float or integer values. How much signal exists per pixel depends, for example, on the lighting conditions (light reflection or scattering), what is being imaged, and even the imaged object's chemical properties.

There are at least two methods that are currently used to detect changes in the extent of large structures. A first method is the more traditional approach of manual comparisons. Here, a first image is manually compared to a second image by a person. The person has to identify a structure that is present in both images and trace the boundary of each structure. The trace is then used to compare the extent of the structures to determine whether there was a change in the extent, and, if there is a change in the extent, measure that change. This process is very time consuming and expensive and relies on human perception to align the trace and determine whether or not there is a change. A second method is based on algorithmically tracing the same structure identified in two images and comparing the trace. This method is computationally expensive as it requires re-extracting an extent for the structure in each image for each comparison and may still require human involvement. Further, the method is prone to errors in extracting the extent, and it is time consuming to process. As discussed below, merely analyzing the images using machine learning will not solve the issues identified for either of these methods.

For machine learning (ML) with digital imagery, the goal is to train a computer system to deconstruct digital images into clusters of aggregated pixels and statistically identify correlations in the clusters. The correlations are iteratively evaluated and "learned" from by the computer system, based on a directive to classify a set of patterns as a specific thing. For example, the directive could be to classify the set of patterns to distinguish between a cat and dog, identify all the cars, find the damage on the roof of a building, and so on. The utilization of neural networks in machine learning is known as deep learning.

Over many imaged objects, regardless of color, orientation, or size of the object in the digital image, these specific patterns for the object are mostly consistent—in effect they describe the fundamental structure of the object of interest. For an example in which the object is a cat, the computer system comes to recognize a cat in an image because the system understands the variation in species, color, size, and orientation of cats after seeing many images or instances of cats. The learned statistical correlations are then applied to new data to extract the relevant objects of interest or information.

Convolutional neural networks (CNN) are machine learning models that have been used to perform this function through the interconnection of equations that aggregate the pixel digital numbers using specific combinations of connections of the equations and clustering the pixels, in order to statistically identify objects (or "classes") in a digital image. Exemplary uses of Convolutional Neural Networks are explained, for example, in "ImageNet Classification with Deep Convolutional Neural Networks," by Krizhevsky et al. (Advances in Neural Information Processing Systems 25, pages 1097-1105, 2012); and in "Fully Convolutional Networks for Semantic Segmentation," by Long et al. (IEEE Conference on Computer Vision and Pattern Recognition, June 2015).

Generative adversarial networks (GANs) are neural network deep learning architectures comprising two neural networks and pitting one against the other. One neural network, called a Generator, generates new data instances, while another neural network, called a Discriminator, evaluates the new data instances for authenticity, that is, the Discriminator decides whether each data instance belongs to the training data set or not. The creation of a generative adversarial network is explained, for example, in "Generative Adversarial Networks," by Goodfellow, et al. (Departement d'informatique et de recherche operationnelle Universite de Montreal, June 2014).

When using computer-based supervised deep learning techniques, such as with a CNN, for digital images, a user provides a series of examples of digital images of the objects of interest to the computer and the computer system uses a network of equations to "learn" significant correlations for the object of interest via statistical iterations of pixel clustering, filtering, and convolving.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest.

In the technological field of remote sensing, digital images may be used for mapping geospatial information. Classifying pixels in an image for geospatial information purposes has been done through various techniques. For example, some CNN-based techniques include Semantic Segmentation (also known as pixel-wise classification or individual pixel mapping) using fully convolutional neural networks (FCN) as described in "Fully Convolutional Networks for Semantic Segmentation," by Long et al., referenced above. In this technique, each pixel in the image is given a label or classification based on training data examples, as discussed in the general overview above. However, the technique is computationally intensive, as it requires resources of computational space, time, and money to assess each individual pixel.

A technique that exists outside of the technological field of geospatial mapping is General Image Classification using a convolutional neural network (CNN), such as that described by Simonyan et al. in the article "Very Deep Convolutional Networks for Large-Scale Image Recognition" (International Conference on Machine Learning, 2015). In General Image Classification, rather than individual pixels being labeled, an entire image is given a generalized label. This is typically a much simpler algorithm than the FCN Semantic Segmentation, and so may require less computation. However, this method provides less information about an image, as it is limited to the image as an aggregated whole as a generalization rather than identifying particulars, such as where objects in the scene are located within the digital image or where particular information is located within the digital image.

What is needed is a system to determine a change in extent of a structure depicted in digital images in which the process is not as computationally expensive as FCN Semantic Segmentation (pixel-wise classification) but is more accurate and provides more information about parts of a digital image than General Image Classification. It is to such an improved system to determine a change in extent of a structure depicted in digital images that the present disclosure is directed.

SUMMARY

The problem of determining a change in extent of a structure depicted in digital images is solved with the systems and methods described herein, including automated extent analysis systems and methods for the detection of changes in extent of one or more structure.

In one aspect of the present disclosure, a non-transitory computer readable medium may store computer executable code that when executed by a processor cause the processor to: align, with an image classifier model, a structure shape of a structure at a first instance of time to pixels within an aerial image depicting the structure, the aerial image captured at a second instance of time; assess a degree of alignment between the structure shape and the pixels within the aerial image depicting the structure, so as to classify similarities between the structure depicted within the pixels of the aerial image and the structure shape using a machine learning model to generate an alignment confidence score; and determine an existence of a change in the structure based upon the alignment confidence score indicating a level of confidence below a predetermined threshold level of confidence that the structure shape and the pixels within the aerial image are aligned.

In one aspect of the present disclosure, the machine learning model may be a convoluted neural network image classifier model and/or a generative adversarial network image classifier model.

In one aspect of the present disclosure, the computer executable instructions when executed by the processor may cause the processor to: identify a shape of the change in the structure using any one or more of: a point cloud estimate, a convolutional neural network, a generative adversarial network, and a feature detection technique.

In one aspect of the present disclosure, aligning the structure shape further comprises: creating the structure shape using an image of a structure captured at the first instance in time.

In one aspect of the present disclosure, the alignment confidence score may be determined by analyzing shape intersection between the structure shape and an outline of the structure depicted within the pixels of the aerial image.

In one aspect of the present disclosure, the structure shape may be a previously determined outline of the structure at the first instance of time.

In one aspect of the present disclosure, the first instance of time may be before the second instance of time or the first instance of time may be after the second instance of time.

In one aspect of the present disclosure, aligning the structure shape may further comprise: detecting edges of the structure in the aerial image; determining one or more shift distance between the structure shape and one or more edges of the detected edges of the structure in the aerial image; and shifting the structure shape by the shift distance.

In one aspect of the present disclosure, the computer executable instructions when executed by the processor may cause the processor to: determine a structural modification based on the existence of the change and on a comparison between the structure shape and the pixels within the aerial image depicting the structure, after the structure shape is shifted by the shift distance.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
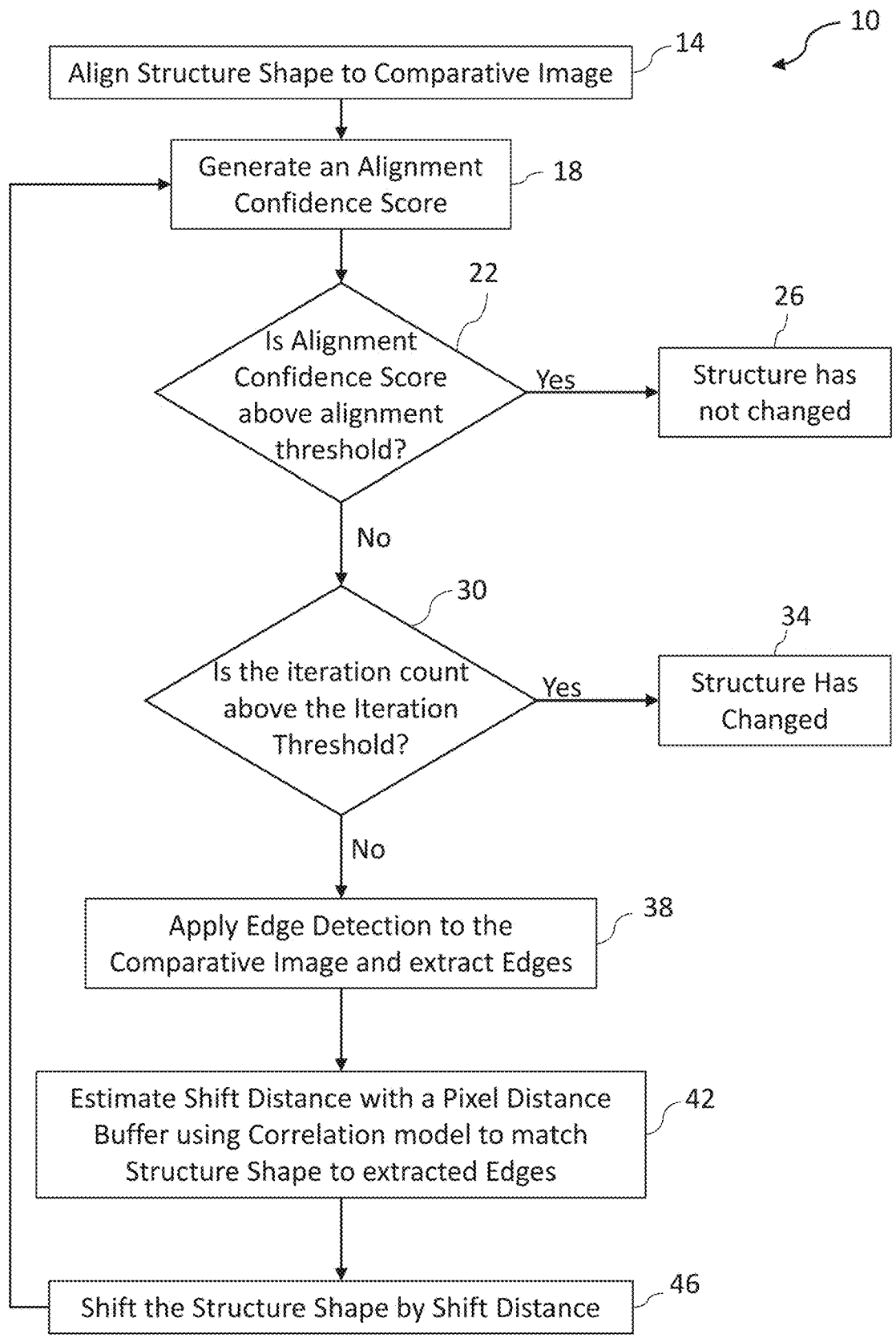
FIG. 1 is a process flow diagram of an exemplary embodiment of an extent analysis method in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although extent change of a structure may be used as an example, the methods and systems may be used to assess other characteristics (by way of example and not limited to, changes in structure footprint or structure area) of other man-made objects, non-exclusive examples of which include buildings such as residential buildings, industrial buildings, or commercial buildings and include infrastructure such as roads, bridges, utility lines, pipelines, utility towers. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions or computer readable code that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like.

Figure 2A:
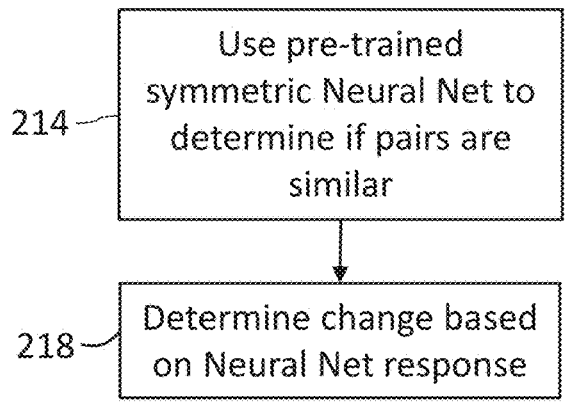
FIG. 2A is a process flow diagram of an exemplary change decision method in accordance with the present disclosure.
Figure 2B:
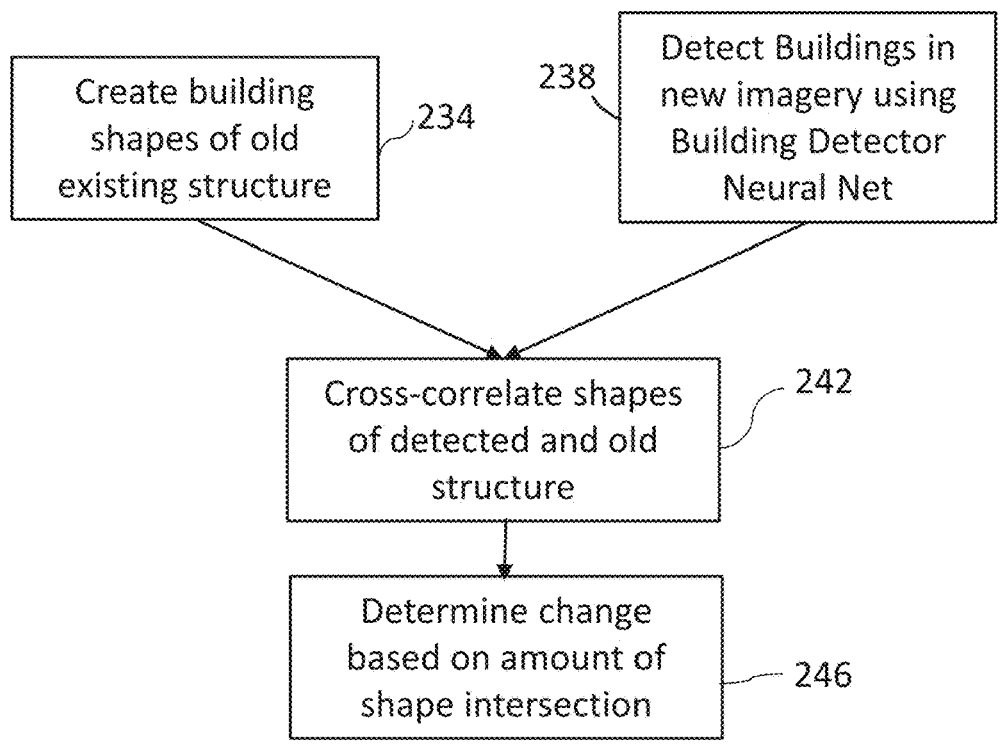
FIG. 2B is a process flow diagram of another exemplary change decision method in accordance with the present disclosure.
Figure 3:
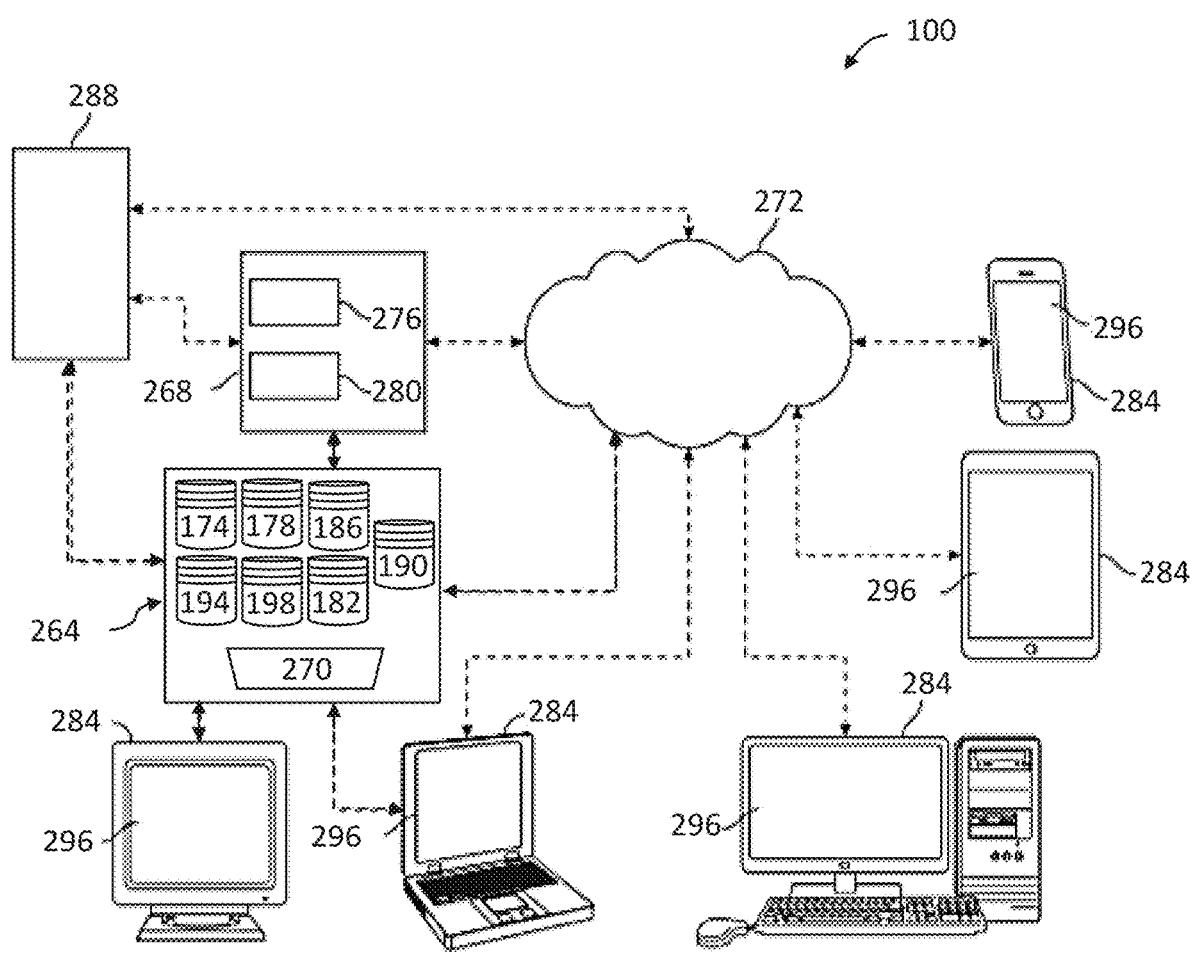
FIG. 3 is an exemplary extent analysis system in accordance with the present disclosure.

Referring now to the drawings, FIG. 1 is a process flow chart depicting an exemplary extent analysis method 10. The extent analysis method 10 may be implemented by an extent analysis system 100 having one or more computer processor 264 (FIG. 3). In general, in the extent analysis method 10, the extent analysis system 100 determines the existence or non-existence of a change to a structure 64 by attempting to align a structure shape 90 of the structure 64 with a comparative image 110 depicting a comparative structure 64'. If the structure shape 90 can be aligned with the comparative structure 64' (and the alignment is at or above a predetermined level of confidence) within a predetermined number of iterations of attempting to align the structure shape 90 with the comparative structure 64', then the extent analysis system 100 determines that the structure shape 90 and the comparative structure 64' are the same and that there has been no change between the structure 64 and the comparative structure 64'. However, if the extent analysis system 100 cannot confidently align the structure shape 90 with the comparative structure 64' within the predetermined number of attempts to align the structure shape 90 with the comparative structure 64', then the extent analysis system 100 determines that the structure shape 90 and the comparative structure 64' are different, that is, that there has been a change between the structure 64 and the comparative structure 64'. In one embodiment, if the extent analysis system 100 determines that there has been a change, then the extent analysis system 100 implements a change decision method 140a, 140b (FIGS. 2A and 2B) to determine what has changed (for example, structural modifications, additions, demolitions) between the structure 64 and the comparative structure 64', such as in the form of an change in extent 130.

More specifically, the extent analysis method 10 utilizes the one or more computer processor 264 to execute software to cause the one or more computer processor 264 to execute the steps of the extent analysis method 10, which comprises, in step 14, aligning a structure shape 90 depicting an extent of a structure 64 (illustrated in FIG. 4B and discussed below) to a comparative image 110, the comparative image 110 being an image of the comparative structure 64' (illustrated in FIG. 5 and discussed below) and, in step 18, generating an alignment confidence score. The extent analysis method 10 may further comprise determining whether the alignment confidence score is at or above an alignment threshold (step 22). If the alignment confidence score is at or above the alignment threshold, the extent analysis method 10 makes a determination that the extent has not changed (step 26). Otherwise, if the alignment confidence score is below the alignment threshold, the extent analysis method 10 determines if an iteration count indicative of a number of iterations of the extent analysis method 10 is at or above a predetermined iteration threshold (step 30). If the number of iterations is above the iteration threshold in conjunction with the alignment confidence score being below the alignment threshold, then the extent analysis method 10 determines that the extent of the structure 64 has changed (step 34).

Otherwise, if the alignment confidence score is below the alignment threshold and the iteration count is below the iteration threshold, in step 38, the extent analysis system 100 may then apply edge detection to the comparative image 110, and may extract edges of the comparative structure 64' in the comparative image 110. The extent analysis system 100 may increase the iteration count by one. The extent analysis method 10 may further comprise estimating a shift distance with a pixel distance buffer using a correlation model to match the structure shape 90 to the extracted edges (step 42); and shifting the structure shape 90 by the shift distance (step 46), in an attempt to align the structure shape 90 with the comparative structure 64'. The extent analysis method 10 may increase the iteration count and then returns to step 18.

The iteration count is a count of a number of loops performed of step 18 to step 46 of the extent analysis method 10 when realigning the structure shape 90 to pixels within the comparative image 110 depicting the comparative structure 64'.

The extent analysis method 10 may further comprise receiving a particular location of the structure 64, such as street address or latitude/longitude, to identify the structure 64 to determine whether or not the structure 64 has changed. In other embodiments, the extent analysis method 10 may receive an identification of a geographic area, and then conduct the extent analysis method 10 on structures 64 within the geographic area. The geographic area can be defined in a number of ways such as a neighborhood, street, city, town or county. Further, the geographic area can be defined by a selection of at least three spatially disposed geographic coordinates. In some embodiments, the extent analysis method 10 may translate (for example, by utilizing a geo-coding provider) structure location information (such as a street address) into a set of coordinates, such as longitude-latitude coordinates, that can be used to query an imagery database 178 or a structure shape database 174 (discussed below) to obtain imagery that can be used to determine the structure shape 90 and to obtain the comparative image 110. Next, the longitude-latitude coordinates of the structure 64 may be used to query the imagery database 178 or structure shape database 174 in order to retrieve one or more images or one or more structure shapes 90 of the structure 64 of interest.

In one embodiment, the structure shape 90 used in step 14 may be a vector boundary of an outline describing the extent of the structure 64. In one embodiment, the structure shape 90 describes a portion of the structure 64 that consists only of a building (to the exclusion of a garden, a sidewalk, a driveway, an outdoor kitchen, a pool, etc. that may be co-located, adjacent to, or overlapping with the building), whereas, in other embodiments, the structure shape 90 may describe a portion of the structure 64 that includes a building and any adjacent features, such as a porch, driveway, patio, gazebo, pergola, awning, carport, shed, or any other feature that may be adjacent to the building. In some cases, the feature(s) is attached to the building. For example, the feature can be an attached porch, awning or carport. In one embodiment, the structure shape 90 is three dimensional, such as a series of edges and nodes defining a three-dimensional wireframe outline of the structure 64, while in other embodiments, the structure shape 90 is two dimensional, such as a two-dimensional structure outline.

The alignment confidence score of step 18 is indicative of the degree to which the structure shape 90 and the structure 64 within the comparative image 110 overlay one another, wherein edges of the structure shape 90 and pixels within the comparative image 110 depicting the edges of the structure 64 are substantially collinear. The alignment confidence score may be based on an assessment of the degree to which the structure shape 90 and the comparative structure 64' within the comparative image 110 overlay one another, that is, to what degree the edges of the structure shape 90 and the pixels depicting the edges of the comparative structure 64' in the comparative image 110 are substantially collinear. The alignment confidence score may be a probability. In one embodiment, the alignment confidence score may be the probability that the structure shape 90 is aligned with the comparative structure 64'.

In one embodiment, generating the alignment confidence score in step 18 is performed by a neural network image classifier model. The neural network image classifier model may be trained to assess alignment and produce the alignment confidence score. The neural network image classifier model may be any of a generative adversarial model, a convoluted neural network, a fully convoluted neural network, any other neural network suitable for generating the alignment confidence score, or any combination of these networks.

The neural network image classifier model may output the alignment confidence score as a probability that the edges of the structure shape 90 and the edges of the structure 64 in the comparative image 110 are substantially collinear. For example, when assessing the alignment of the structure shape 90 and the edges of the structure 64, the model may determine there is a 95% level of confidence that all sides of the structure shape 90 align to the extracted edges of the structure 64. As another non-exclusive example, the model may determine there is an 85% level of confidence that the structure shape 90 aligns to the edges of the structure 64 for each edge of the structure 64.

The alignment threshold is a minimum limit of the alignment confidence score, above which the extent analysis system 100 determines that the structure 64 has not changed. In other words, if the alignment confidence score is at or above the alignment threshold, it indicates that the structure 64 has not changed, because the alignment confidence score indicates an acceptable (based on the alignment threshold) level of confidence that the structure shape 90 is aligned with the comparative structure 64' in the comparative image 110. If the alignment confidence score is under the alignment threshold, it indicates that the structure 64 has changed, because it indicates that there is a low (based on the alignment threshold) level of confidence that the structure shape 90 is aligned with the comparative structure 64' in the comparative image 110 (that is, the structure shape 90 does not match the comparative structure 64' in the comparative image 110). The alignment threshold may be set by a user or may be determined by a neural network model trained to make such a determination. For example, the alignment threshold may be set or determined based on the level of processing desired and/or based on the accuracy of the output results. In one embodiment, the alignment threshold may be set or determined to be 60%, 70%, 80%, 90%, or to be any percentage that is desired by the user. The alignment threshold may be at or above the set value or simply above the set value.

The iteration threshold in step 30 may be a maximum number of iterations of the loop performed between step 18 and step 46 before a determination is made that the structure has changed (step 34). The iteration threshold may be set by a user or may be determined by an artificial intelligence model, e.g., a neural network model trained to make such a determination. If the neural network does not reach (or exceed) the alignment threshold after a number of iterations equal to the iteration threshold, the structure is considered to be changed. The iteration threshold may be set or determined based on the level of processing desired and/or based on the accuracy of the output results. In one embodiment, the iteration threshold may be set or determined to be 1, 10, 100, 1000, or to be any iteration count that is desired by the user.

In step 38, the extent analysis method 10 may apply edge detection analysis to the comparative image 110, and may extracts edge for the comparative structure 64' in the comparative image 110. Edge detection is the process of determining key-points and/or junctions within an image that are consistent with an edge. In one embodiment, edge detection and extraction may be performed using a combination of computer vision techniques, such as Canny Edge detection and fused with Line-Segment-Detection (LSD), or an artificial intelligence technique utilizing convolutional neural networks trained to find key-points and/or junctions consistent with edges within an image.

In step 42, the extent analysis method 10 may estimate the shift distance with a pixel distance buffer using a correlation model to match the structure shape 90 to the extracted edges. The shift distance (which may also be known as pixel shift distance) is a distance the structure shape 90 would be adjusted in order to align to an extracted edge depicted within the comparative image 110. In one embodiment, the shift distance may be determined based on computer vision line-segment-detection and a 2D cross correlation method. The shift distance may be computed then adjusted with a pixel distance buffer to limit the shift. In one embodiment, the pixel distance buffer may be determined by seeding with a random number or may be determined by a number of pixels within a certain distance from the structure shape 90. The pixel distance buffer may scale with the resolution of the comparative image 110 such that a higher-resolution image may have a higher pixel distance buffer than a lower-resolution image of the same geographical area wherein the pixel distance buffer of the higher-resolution image and the pixel distance buffer of the lower-resolution image represent an equivalent real-world distance. In another embodiment, a neural network approach is used to determine the shift distance. In the neural network approach, the shift distance may be based on feature matching performed in the convolutional neural network.

In one embodiment, the base image 60 and/or the comparative image 110 may have a resolution between approximately three inches and approximately six inches. In one embodiment, the base image 60 and/or the comparative image 110 may have a resolution of more than approximately six inches.

After the shift distance is estimated, in step 46 the extent analysis system 100 may shift the structure shape 90 a distance equal to the estimated shift distance.

After the extent analysis method 10 determines the structure 64 has changed in step 34 of the extent analysis method 10, then the change decision method 140a, 140b may be implemented to detect the change in extent 130. The one or more computer processor 264 may execute computer software to determine the change in extent 130 of the structure 64 to the comparative structure 64', by carrying out the change decision method 140a, 140b. Determining the change in extent 130 of the structure 64 may be accomplished by utilizing a neural net (as shown in FIG. 2A), or first creating the structure shape 90 for the image 60 from the first instance in time and then comparing that structure shape 90 to pixels depicting the structure 64' in the comparative image 110 from the second instance in time (as shown in FIG. 2B). Additionally, or alternatively, determining the change in extent 130 of the structure 64 may be accomplished using other comparative techniques.

In general, to determine the change in extent 130, the extent analysis system 100 may analyze the structure shapes 90, analyze the comparative images 110, and/or analyze the base images 60. A change solution may include a determination of whether there is a change in extent 130 between the structure shape 90 and the comparative structure 64' and may define and/or categorize the change, such as by identifying changed areas as compared to the structure shape 90. In one embodiment, the extent analysis system 100 implements a change decision method 140a utilizing a trained machine learning system to detect the change in extent 130. In one embodiment, the extent analysis system 100 may be a spatially aware system and/or the base images 60 and structure shapes 90 may be stored in a spatially relational database.

FIG. 2A illustrates one exemplary embodiment of the change decision method 140a of analyzing the base images 60 and the comparative images 110 to identify the change in extent 130 of one or more of the structure 64. In step 214, the change decision method 140a uses a neural network to produce a response regarding any change in extent 130 of the structure 64 from the base images 60 and the comparative images 110. Then, the change decision method 140a branches to step 218 to determine whether there is the change in extent 130 based upon the response from the neural net.

FIG. 2B depicts another exemplary embodiment of a change decision method 140b for determining the change in extent by analyzing the base image 60 from the first instance in time and comparing to the comparative image 110 from the second instance in time. The change decision method 140b generally includes creating the structure shape 90 for the base image 60 from the first instance in time (step 234), detecting the comparative structure 64' in the comparative image 110 from the second instance in time (step 238), correlating the structure shape 90 for the image 60 from the first instance in time with the comparative structure 64' in the comparative image 110 from the second instance in time (step 242), and determining, based on the amount of shape intersection between the structure shape 90 and the comparative structure 64' in the comparative image 110 from the second instance in time, the change in extent (step 246). In one embodiment, the correlation may be done utilizing a neural network.

In one embodiment, the one or more computer processor 264 may identify a shape of the change in extent 130 in the comparative structure 64' using any one or more of: a point cloud estimate, a convolutional neural network, a generative adversarial network, and a feature detection technique.

In one embodiment, if the extent analysis system 100 determines that there exists the change in extent 130, then the extent analysis system 100 may determine the change in extent 130 at the second instance of time. The extent analysis system 100 may then store the change in extent 130 at the second instance of time into one or more database. The extent analysis system 100 may store one or more of the following in one or more database: a meta-data of the extent, a timestamp of the creation of the comparative image 110, a GPS location of the change in extent 130, the area of the change in extent 130, and other information about the change in extent 130. By storing this information when it is shown that the change in extent 130 exists, the extent analysis system 100 can decrease processing time for future comparisons of the change in extent 130 at the second instance of time, and with the structure 64 or the comparative structure 64' at a third instance in time.

The extent analysis method 10 and the change decision method 140a, 140b may be carried out with the extent analysis system 100. Depicted in FIG. 3 is an exemplary embodiment of the extent analysis system 100. In one embodiment, the extent analysis system 100 may comprise the one or more computer processor 264 and one or more database.

In one embodiment, the one or more database may comprise an existing structure shape database 174 and a new imagery database 178. The existing structure shape database 174 may store one or more of the structure shapes 90. The structure shapes 90 may be derived from one or more base image 60 captured at the first instance in time depicting the structure 64 at the first instance of time. The new imagery database 178 may store one or more of the comparative images 110. The comparative image(s) 110 within the new imagery database 178 may be captured at the second instance of time and may depict the comparative structure 64', which is typically the structure 64 at the second instance of time (but may be the absence of or addition of more structures 64).

The extent analysis system 100 may further comprise one or more non-transitory memory 268. The computer processor 264 may include (or be communicatively coupled with) one or more communication component 270. The non-transitory memory 268 may store the existing structure shapes database 174, the new imagery database 178, the existing imagery database 186, the aligned and updated structure shapes database 194, and the confidence of change database 198, and computer software. The existing structure shapes database 174, the new imagery database 178, the existing imagery database 186, the aligned and updated structure shapes database 194, and the confidence of change database 198 may be separate databases, or may be integrated into a single database. The computer system 260 may include a network 272 enabling bidirectional communication between the computer processor 264 and the non-transitory memory 268 with a plurality of user devices 284. The user devices 284 may communicate via the network 272 and/or may display information on a screen 296. The computer processor 264 or multiple computer processors 264 may or may not necessarily be located in a single physical location.

In one embodiment, the network 272 is the Internet and the user devices 284 interface with the computer processor 264 via the communication component 270 using a series of web pages 288. It should be noted, however, that the network 272 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer processor 264 and the non-transitory memory 268 may be implemented with a server system having multiple servers in a configuration suitable to provide a commercial computer-based business system such as a commercial web-site and/or data center.

The one or more computer processor 264 may execute computer software to align the structure shapes 90 to the structures 64 depicted in the comparative images 110 stored within the new imagery database 178. In one embodiment, the one or more computer processor 264 may execute computer software to store the aligned structure shapes 90 in the one or more database, such as in an updated structure shapes database 194. In one embodiment, the one or more computer processor 264 may execute computer software to store the alignment confidence scores in the one or more database, such as in a confidence of change database 198. Though the databases 174, 178, 186, 194, and 198 are shown as separate entities for clarity, it will be understood that one or more or all of the databases 174, 178, 186, 194, and 198 may be combined.

Figure 4A:
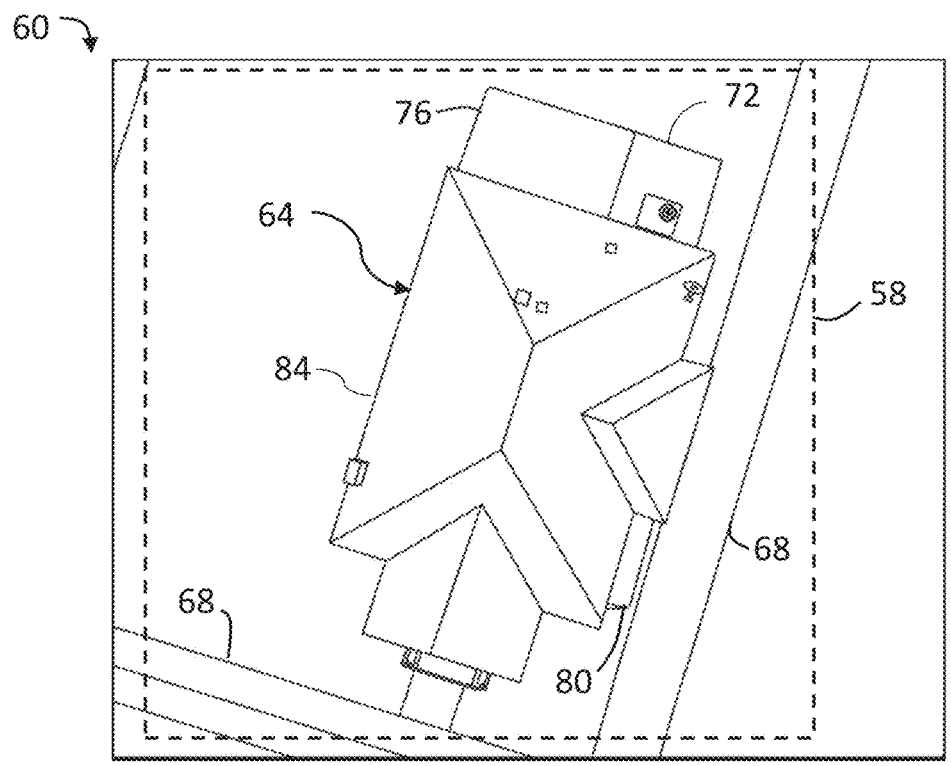
FIG. 4A is an exemplary nadir image depicting a structure of interest at a first instance of time in accordance with the present disclosure.

Examples of the extent analysis system 100, extent analysis method 10, and change decision method 140a, 140b in use will now be described. Referring now to FIG. 4A, shown therein is an exemplary base image 60 captured at a first instance in time. In one embodiment, the base image 60 is a nadir, or ortho, view of a property 58, including the structure 64 and a sidewalk 68. The structure 64 may include numerous features such as, but not limited to: a slab 72 for utilities, a porch awning 76, a garden 80, and a roof 84. While the base image 60 shows only one property 58 having one structure 64, the base image 60 and/or the comparative image 110 may show more than one property 58, with each property 58 having one or more than one structure 64.

By way of example, the structure 64 depicted in the base image 60 in FIG. 4A is a house, however, the structure 64 may be a naturally occurring structure such as a tree or a man-made structure such as a building or shed. In general, the structure 64 may be any type of object for which an extent may be defined, that is, any structure 64 that has a size (e.g., length, width, and/or area) and a shape that can be compared to a size and shape of the structure shape 90. It is understood that the base image 60 may show more than simply a structure 64 and a sidewalk 68, but may include any number of objects in the base image 60 near the structure 64 and/or on the property 58 such as, but not limited to, vegetation, water features such as rivers, lakes, ponds, and creeks, other human-made structures such as roads, trails, or buildings, animals, and/or the like.

The base image 60 may be captured from an aerial perspective over the structure 64 and/or from a ground-based perspective. With respect to the aerial perspective, the base image 60 may be a nadir image captured from a directly overhead viewpoint, also referred to as an ortho view or nadir view. A nadir image is typically taken directly below and/or vertically downward from a camera lens positioned above the structure 64 (as shown in FIG. 4A). The base image 60 may be an oblique image captured from an overhead aerial oblique view. An aerial oblique view may be taken from approximately 10 degrees to approximately 75 degrees from a nadir direction. In one embodiment, one or more of the base images 60 may be nadir image(s) and one or more of the base images 60 may be oblique image(s).

In one embodiment, the extent analysis system 100 may identify any structure 64 that is not depicted in the base image 60 but that is depicted in the comparative image 110 as a new structure 64. The extent analysis system 100 may determine a geo-location (e.g., latitude/longitude) of the structure 64 in the comparative image 110 and then analyze one or more base image 60 to determine whether the structure 64 is depicted within the pixels of the base image (s) 60 at other instances of time.

Figure 4B:
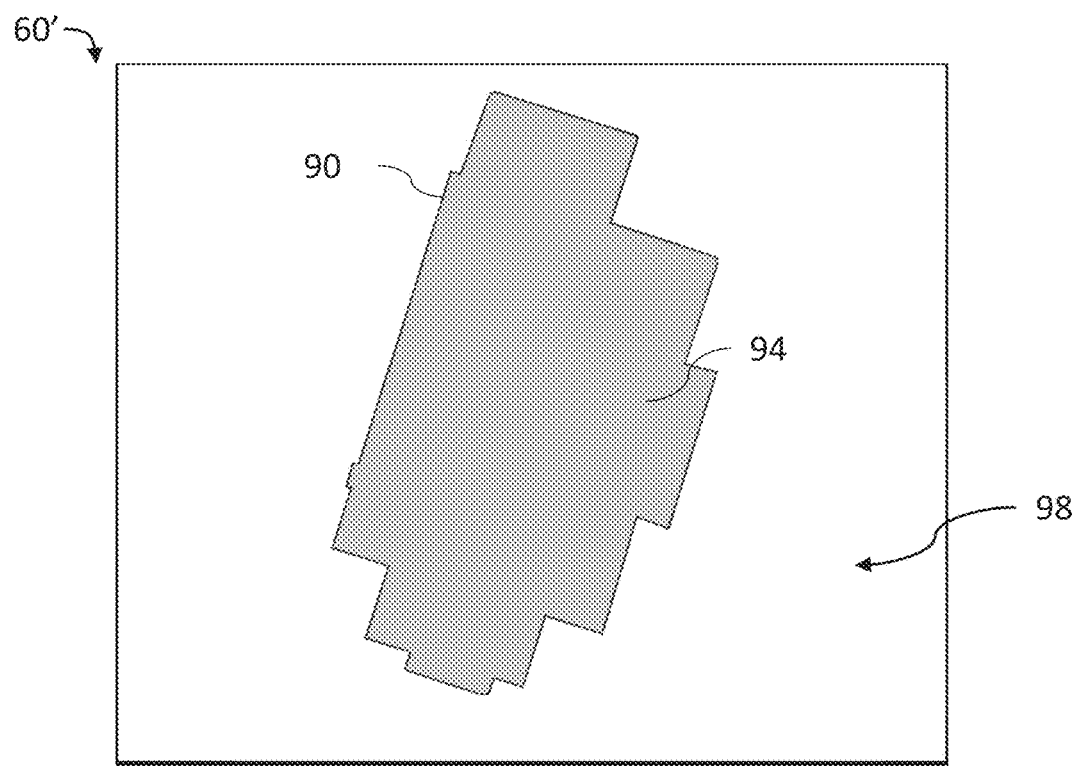
FIG. 4B is an exemplary image depicting a structure shape of the structure of FIG. 4A in accordance with the present disclosure.

Referring now to FIG. 4B, shown therein is a vector trace 60' of the base image 60. The vector trace 60' includes at least three components, a structure extent 94, the structure shape 90 encompassing or surrounding the structure extent 94, and an exterior area of a structure trace 98 outside of the structure shape 90. The structure extent 94 may also be called a boundary extent of the structure 64. The structure extent 94 may be determined by manual selection of vertices (corners, etc.) in an ortho image, by using a point cloud, or by using a neural network. Techniques for making and using a point cloud, and determining a boundary of a roof within the point cloud are discussed in U.S. Patent Publication No. 201662295336, the entire content of which is hereby incorporated herein by reference. The neural network may be, for example, a convolutional neural network, a generative adversarial network, or any other neural network configured to determine the structure extent 94.

Figure 5:
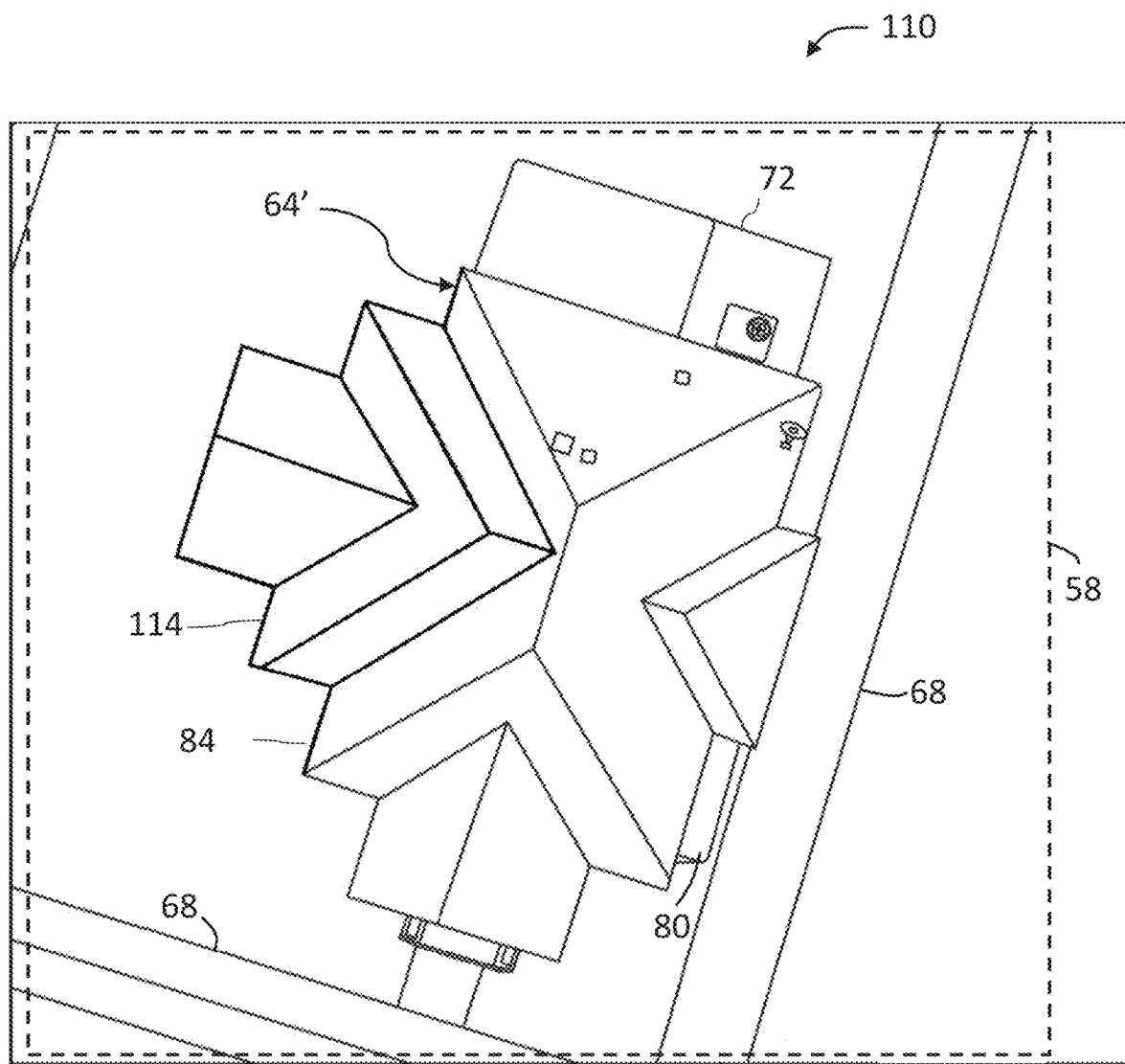
FIG. 5 is an exemplary nadir image depicting the structure of interest at a second instance of time in accordance with the present disclosure.

FIG. 5 shows an exemplary comparative image 110 captured at a second instance in time. The second instance of time can be before or after the first instance of time. The comparative image 110 depicts a comparative structure 64', the comparative structure 64' being the structure 64 at the second instance in time. The second instance of time is different from the first instance of time. Thus, any changes to the structure 64 which occurred between the first instance of time and the second instance of time may be reflected in the comparative structure 64' in the comparative image 110.

The comparative structure 64' may include many of the same features as structure 64 including the slab 72 for utilities, the porch awning 76, the garden 80 and the roof 84. However, in the example shown in FIG. 3, the comparative structure 64' further includes a structural modification 114. While the comparative image 110 depicts one structural modification 114, it is understood that the comparative image 110 may depict more than one structural modification 114, and it is understood that the structural modification 114 can be any modification made to the structure 64, any of its features, or the addition of any features. It is understood that the comparative image 110 may depict a comparative structure 64' wherein the comparative structure 64' has had features removed, such as a comparative structure 64' wherein the porch awning 76 was removed from structure 64 and is no longer depicted in the comparative image 110. It is further understood that differences in the comparative image 110 from the base image 60 are not limited to merely the features of the comparative structure 64', but may include the addition of or removal of one or more structures 64 in the base image 60, or that are associated with the structure 64 such as a shed, carport, gazebo, or any other structure that may be constructed.

The base image 60 may be an aerial nadir image and the comparative image 110 may also be an aerial nadir image. In certain embodiments, the base images 60 and the comparative images 110 may be taken from similar viewpoints, i.e., either nadir or oblique. In some embodiments, the base images 60 and 110 are captured from similar compass directions, i.e., North, South, East or West. Similar compass direction, as used herein, refers to images captured within plus or minus thirty-degree compass directions of one another. In other embodiments, the base image 60 and the comparative image 110 can be captured from different viewpoints. In some embodiments, the base image 60 may be an aerial nadir image, and the comparative image 110 may be an aerial oblique image taken from approximately 10 degrees from the nadir direction.

Exemplary image capture systems that can be used to capture the base image 60 and/or the comparative image 110 include those disclosed in U.S. Pat. Nos. 7,424,133, 8,385, 672, and U.S. Ser. No. 16/226,320 (published as US 2019-0149710 A1), the entire contents of each of which are hereby incorporated herein by reference.

In one embodiment, each of the base images 60 and/or the comparative images 110 may have a unique image identifier such as by use of metadata, or otherwise stored in such a way that allows a computer system 260 to definitively identify each of the base images 60 and/or the comparative images.

In one embodiment, the base images 60 and/or the comparative images may be geo-referenced, that is, processed such that pixels in the base images 60 and/or the comparative images 110 have a determined geo-location, such as x, y, and z coordinates and/or latitude, longitude, and elevation coordinates. See, for example, U.S. Pat. No. 7,424,133 that describes techniques for geolocating oblique images and measuring within the oblique images. The entire content of U.S. Pat. No. 7,424,133 is hereby incorporated herein by reference. Also see for example WO2018071983, titled "An Image Synthesis System". The geo-location data can be stored as metadata within the images or stored separately from the images and related to the images using any suitable technique, such as unique identifiers. The georeferencing information associated with the base images 60 and the comparative images 110 can be used to correlate the structure shape 90 with the comparative structure 64' depicted within the comparative image 110. In other embodiments, the base images 60 and the comparative images 110 are not geo-referenced.

In one embodiment, the base images 60 and the comparative images 110 are constrained to a given, occupied parcel. By constraining each of the base images 60 and the comparative images 110 to a given, occupied parcel, some assumptions can be made about the existence of a structure and any possible changes. For instance, assumptions regarding any changes in extent may be made that would limit the changes to changes that may be performed on an occupied parcel. These assumptions are especially important when making a determination on a type of change in the extent, such as an addition of a porch or garage. Such assumptions would also result in efficiency gains in a drawing process for the structure shape 90 for change detection.

Figure 6:
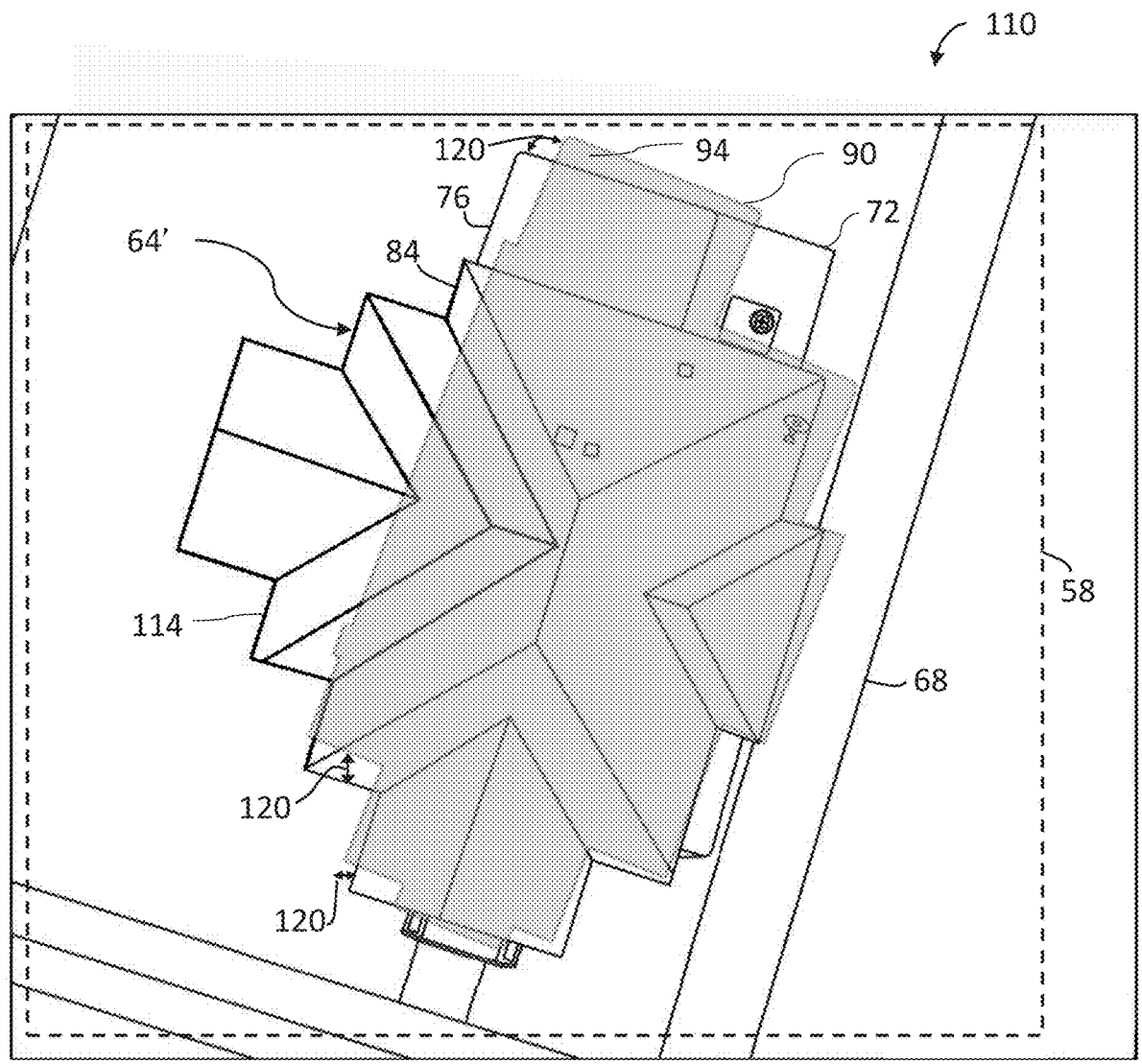
FIG. 6 is the image of FIG. 5 depicting the structure at the second instance in time overlaid with an unaligned structure shape depicted in FIG. 4B at the first instance in time.

Shown in FIG. 6 is the comparative image 110 of FIG. 5 in which the structure shape 90 and the structure extent 94 of the structure 64 are superimposed onto the comparative structure 64'. In this example, the structure shape 90 and the structure extent 94 of the structure 64 are unaligned with the comparative structure 64'. In addition to the structure features of the roof 84, structural modification 114, and slab 72 for utilities, FIG. 6 shows a shift difference 120 between the structure shape 90 and the comparative structure 64'. The shift difference 120 may be measured in more than one direction, that is, the shift difference 120 may be measured by a number of pixels in a vertical direction, the vertical direction being, for example, a direction from the lower edge of the image to the upper edge of the image, and/or in a horizontal direction, the horizontal direction being, for example, the direction from the left-most edge of the image to the right-most edge of the image. The shift difference 120 may be a rotational value. In other embodiments, the comparative image 110 may be scaled. Scaling the comparative image 110 may be based, at least in part, on the shift distance and the alignment confidence score. The shift difference(s) 120 may be measured or determined to produce the shift distance(s).

Figure 7:
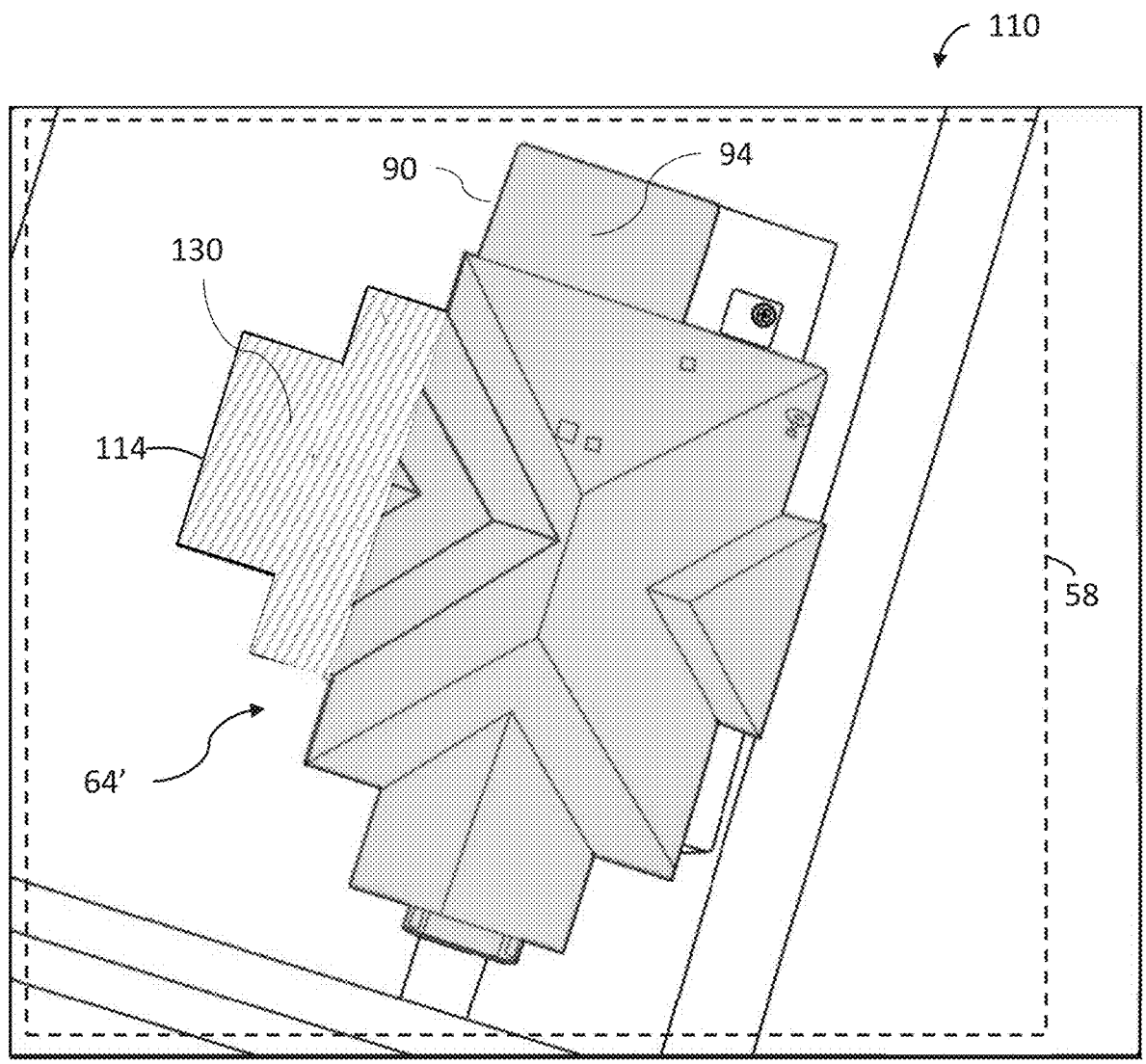
FIG. 7 is the image of FIG. 4 depicting the structure at the second instance in time overlaid with an aligned structure shape of FIG. 4B depicting the structure shape at the first instance in time and showing an identified change in an extent of the structure.

FIG. 7 shows the comparative image 110 of FIG. 5 and the structure shape 90 and the structure extent 94 of structure 64 superimposed and now aligned onto the comparative structure 64' in the comparative image 110 (such as based on the shift distance). As shown in FIG. 7, the structure shape 90 and the structure extent 94 cover the portion of the comparative structure 64' that was present in the structure 64 at the first instance in time. A portion of the comparative structure 64' that is not covered by the structure shape 90 and the structure extent 94 is identified by a striped region defining a portion of the comparative structure 64' that has been added (a structural modification 114) that makes up the change in extent 130. The change in extent 130 is the difference in the extent 94 of the structure 64 at the first instance in time and the extent of the comparative structure 64' at the second instance in time.

The one or more computer processor 264 may identify a shape of the change in extent 130 in the comparative structure 64' using any one or more of: a point cloud estimate, a convolutional neural network, a generative adversarial network, and a feature detection technique.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For exemplary purposes, examples of images 60 and 110 of residential structures have been used. However, it is to be understood that the example is for illustrative purposes only and is not to be construed as limiting the scope of the invention.

The extent analysis system 100, the extent analysis method 10, and the change decision methods 140a, 140b may be used for a wide variety of real-world applications with respect to the structure 64. Non-exclusive examples of such applications include use of the results of the methods to determine a tax assessment, provide and/or complete inspections, to evaluate condition, to repair, to create underwriting, to insure, to purchase, to construct, or to value the structure 64. For example, a municipality may tax real estate property based on the size and type of the structures 64 located on the property. Detecting and determining the extent of change to the structures 64 can be used to adjust such taxes. As another example, municipalities may require building permits for changes to structures 64 or the addition or demolition of structures. Detecting and determining the extent of change to the structures 64 can be used to monitor such changes, additions, and demolitions. As yet another example, insurance companies may underwrite and/or pay for repair of structures 64 based at least in part on size and condition of the structures 64. Detecting and determining the extent of change to the structures 64 can be used to create and/or monitor insurance underwriting or assessment.

What is claimed is:

1. A non-transitory computer readable medium storing computer executable code that when executed by a processor cause the processor to:
    align, with an image classifier model, a structure shape of a structure at a first instance of time to pixels within an aerial image depicting the structure, the aerial image captured at a second instance of time;
    assess a degree of alignment between the structure shape and the pixels within the aerial image depicting the structure, so as to classify similarities between the structure depicted within the pixels of the aerial image and the structure shape using a machine learning model to generate an alignment confidence score; and
    determine an existence of a change in the structure based upon the alignment confidence score indicating a level of confidence below a predetermined threshold level of confidence that the structure shape and the pixels within the aerial image are aligned.

2. The non-transitory computer readable medium of claim 1, wherein the machine learning model is a convoluted neural network image classifier model.

3. The non-transitory computer readable medium of claim 1, wherein the machine learning model is a generative adversarial network image classifier model.

4. The non-transitory computer readable medium of claim 1, further comprising computer executable instructions that when executed by the processor cause the processor to:
    identify a shape of the change in the structure using any one or more of: a point cloud estimate, a convolutional neural network, a generative adversarial network, and a feature detection technique.

5. The non-transitory computer readable medium of claim 1, wherein aligning the structure shape further comprises:
    creating the structure shape using an image of a structure captured at the first instance of time.

6. The non-transitory computer readable medium of claim 1, wherein the alignment confidence score is determined by analyzing shape intersection between the structure shape and an outline of the structure depicted within the pixels of the aerial image.

7. The non-transitory computer readable medium of claim 1, wherein the structure shape is a previously determined outline of the structure at the first instance of time.

8. The non-transitory computer readable medium of claim 1, wherein the first instance of time is before the second instance of time.

9. The non-transitory computer readable medium of claim 1, wherein the first instance of time is after the second instance of time.

10. The non-transitory computer readable medium of claim 1, wherein aligning the structure shape further comprises:
    detecting edges of the structure in the aerial image;
    determining one or more shift distance between the structure shape and one or more edges of the detected edges of the structure in the aerial image; and
    shifting the structure shape by the shift distance.

11. The non-transitory computer readable medium of claim 10, further comprising computer executable instructions that when executed by the processor cause the processor to:

determine a structural modification based on the existence of the change and on a comparison between the structure shape and the pixels within the aerial image depicting the structure, after the structure shape is shifted by the shift distance.

12. A method, comprising:

aligning, automatically with one or more processor utilizing an image classifier model, a structure shape of a structure at a first instance of time to pixels within an aerial image depicting the structure, the aerial image captured at a second instance of time;

assessing, automatically with the one or more processor, a degree of alignment between the structure shape and the pixels within the aerial image depicting the structure, so as to classify similarities between the structure depicted within the pixels of the aerial image and the structure shape using a machine learning model to generate an alignment confidence score; and determining, automatically with the one or more processor, an existence of a change in the structure based upon the alignment confidence score indicating a level of confidence below a predetermined threshold level of confidence that the structure shape and the pixels within the aerial image are aligned.

13. The method of claim 12, wherein the machine learning model is at least one of a convoluted neural network image classifier model and a generative adversarial network image classifier model.

14. The method of claim 12, further comprising:

identifying, automatically with the one or more processor, a shape of the change in the structure using any one or more of: a point cloud estimate, a convolutional neural network, a generative adversarial network, and a feature detection technique.

15. The method of claim 12, wherein aligning the structure shape further comprises:

creating, automatically with the one or more processor, the structure shape using an image of a structure captured at the first instance of time.

16. The method of claim 12, wherein the alignment confidence score is determined by analyzing shape intersection between the structure shape and an outline of the structure depicted within the pixels of the aerial image.

17. The method of claim 12, wherein the structure shape is a previously determined outline of the structure at the first instance of time.

18. The method of claim 12, wherein the first instance of time is before the second instance of time or the first instance of time is after the second instance of time.

19. The method of claim 12, wherein aligning the structure shape further comprises:

detecting edges of the structure in the aerial image;

determining one or more shift distance between the structure shape and one or more edges of the detected edges of the structure in the aerial image; and shifting the structure shape by the shift distance.

20. The method of claim 19, further comprising:

determining, automatically with the one or more processor, a structural modification based on the existence of the change and on a comparison between the structure shape and the pixels within the aerial image depicting the structure, after the structure shape is shifted by the shift distance.

* * * * *